(12) United States Patent
Lee et al.

(10) Patent No.: US 8,559,403 B2
(45) Date of Patent: Oct. 15, 2013

(54) METHOD FOR TRANSMITTING A DOWNLINK SIGNAL IN A MULTI-ANTENNA WIRELESS COMMUNICATION SYSTEM, AND APPARATUS FOR SAME

(75) Inventors: Dae Won Lee, Anyang-si (KR); Dong Wook Roh, Anyang-si (KR); Byeong Woo Kang, Anyang-si (KR); Yu Jin Noh, Anyang-si (KR); Byoung Hoon Kim, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 13/375,461

(22) PCT Filed: Jun. 29, 2010

(86) PCT No.: PCT/KR2010/004080
§ 371 (c)(1),
(2), (4) Date: Nov. 30, 2011

(87) PCT Pub. No.: WO2011/002173
PCT Pub. Date: Jan. 6, 2011

(65) Prior Publication Data
US 2012/0087346 A1    Apr. 12, 2012

Related U.S. Application Data

(60) Provisional application No. 61/222,082, filed on Jun. 30, 2009.

(30) Foreign Application Priority Data

Jun. 28, 2010    (KR) .................. 10-2010-0061433

(51) Int. Cl.
*H04B 7/216* (2006.01)
(52) U.S. Cl.
USPC ........................ 370/335; 370/342; 370/441
(58) Field of Classification Search
USPC .......................................... 370/335, 342, 441
See application file for complete search history.

(56) References Cited

U.S. PATENT DOCUMENTS

| | | | |
|---|---|---|---|
| 2006/0155533 A1 | 7/2006 | Lin et al. | |
| 2008/0247364 A1* | 10/2008 | Kim et al. | 370/336 |
| 2009/0197546 A1* | 8/2009 | Kim et al. | 455/101 |
| 2010/0027697 A1* | 2/2010 | Malladi et al. | 375/260 |

FOREIGN PATENT DOCUMENTS

| | | |
|---|---|---|
| WO | 2006018710 | 2/2006 |
| WO | 2008058112 | 5/2008 |

* cited by examiner

*Primary Examiner* — Ronald Abelson
(74) *Attorney, Agent, or Firm* — Lee, Hong, Degerman, Kang & Waimey

(57) ABSTRACT

The present application discloses a method for transmitting a downlink signal in a multi-antenna wireless communication system. In detail, the method comprises: a step of mapping a signal of a codeword domain to a signal of a layer domain; a step of mapping the signal of the layer domain to a signal of a virtual antenna port domain using a precoding matrix; and a step of transmitting the signal of the virtual antenna port domain to a physical antenna port, wherein the precoding matrix is changed in a channel measurement unit, and the signal of the layer domain is layer-permutated in the channel measurement unit. Preferably, the channel measurement unit is constituted by one or more resource blocks (RBs).

10 Claims, 18 Drawing Sheets

FIG. 2
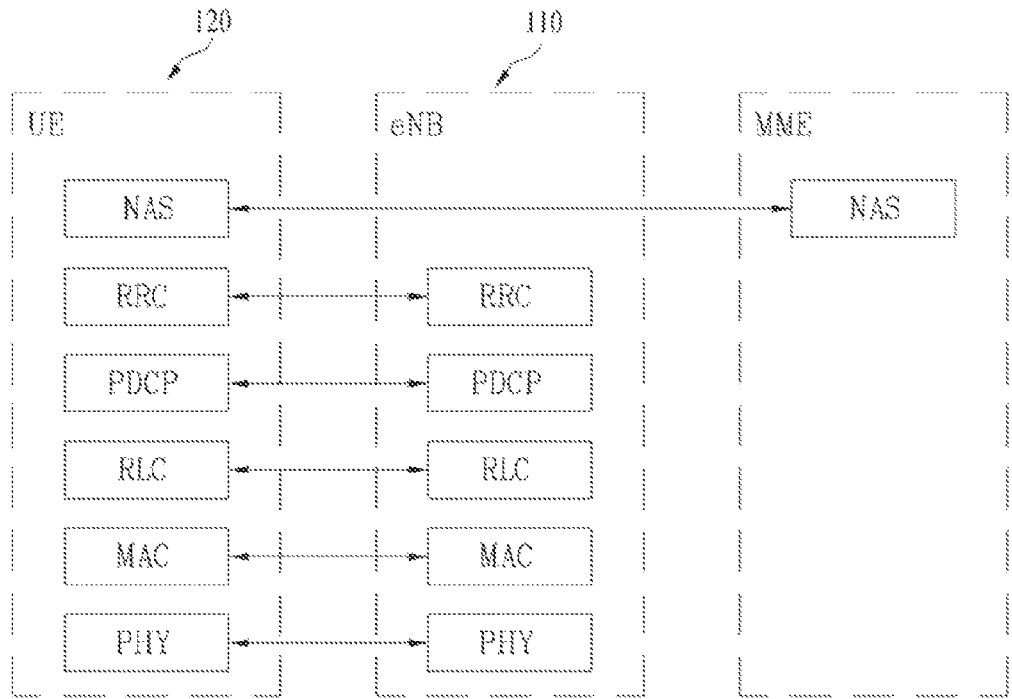
(a) Control-plane protocol stack
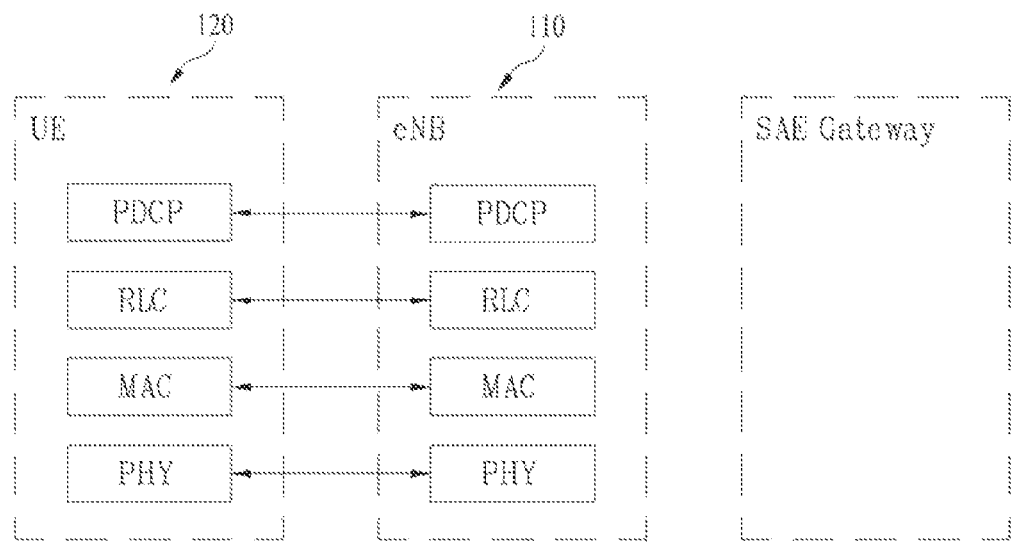
(b) User-plane protocol stack

METHOD FOR TRANSMITTING A DOWNLINK SIGNAL IN A MULTI-ANTENNA WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2010/004080, filed on Jun. 29, 2010, which claims the benefit of earlier filing date and right of priority to Korean Application Serial No. 10-2010-0061433, filed on Jun. 28, 2010, and also claims the benefit of U.S. Provisional Application Ser. No. 61/222,082, filed on Jun. 30, 2009, the contents of all of which are incorporated by reference herein in their entireties.

TECHNICAL FIELD

The present invention relates to a wireless communication system, and more particularly, to a method of generating a reference signal sequence in a multi-antenna wireless communication system and apparatus therefor.

BACKGROUND ART

Generally, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called multiple antennas.

The MIMO technique does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

FIG. 1 is a diagram for a configuration of a general MIMO communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, theses techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \quad \text{[Formula 2]}$$

Meanwhile, transmission powers can be set different from each other for transmission information $S_1, S_2, \ldots, S_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots \hat{s}_{N_T}]^T = [P_1 s_1, P_2 s_2, \ldots, P_{N_T} s_{N_T}]^T \quad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Formula 5]}$$

$$= W\hat{s} = WPs$$

Meanwhile, in a space multiplexing scheme, transmission informations $s_1, s_2, \ldots, s_{N_T}$ may have values different from each other, respectively. Meanwhile, in a transmit diversity scheme, transmission informations $s_1, s_2, \ldots, s_{N_T}$ may have values equal to each other, respectively. General transmit diversity schemes may include STBC (Space Time Block Coding), SFBC (Space Frequency Block Coding), CDD (Cyclic Delay Diversity) and the like.

DISCLOSURE OF THE INVENTION

Technical Problem

Based on the above-mentioned discussion, a method for transmitting a downlink (DL) in a multi-antenna wireless communication system and apparatus for the same shall be proposed in the following description.

Technical Solution

To achieve these and other advantages and in accordance with the purpose of the present invention, as embodied and broadly described, a method of transmitting a downlink signal in a multi-antenna wireless communication system according to one embodiment of the present invention may include the steps of mapping a signal of a codeword domain to a signal of a layer domain, mapping the signal of the layer domain to a signal of a virtual antenna port domain using a precoding matrix, and transmitting the signal of the virtual antenna port domain by allocating the signal of the virtual antenna port domain to a physical antenna port, wherein the precoding matrix is changed by a channel measurement unit and wherein layer permutation is performed on the signal of the layer domain within the channel measurement unit.

Preferably, the channel measurement unit may include at least one resource block (RB).

More preferably, the layer permutation may permutate the signal of the codeword domain by a bit unit before mapping the signal of the codeword domain to the signal of the layer domain or permutate the signal of the layer domain by a bit unit or a symbol unit before mapping the signal of the layer domain to the signal of the virtual antenna port domain.

Preferably, the step of mapping to the signal of the layer domain may include the step of permutating data included in each signal of the codeword domain by a bit unit.

To further achieve these and other advantages and in accordance with the purpose of the present invention, as embodied and broadly described, a base station according to another embodiment of the present invention may include a processor mapping a signal of a codeword domain to a signal of a layer domain, the processor mapping the signal of the layer domain to a signal of a virtual antenna port domain using a precoding matrix, the processor allocating the signal of the virtual antenna port domain to a physical antenna port and a transmitting module transmitting the signal allocated to the physical antenna port, wherein the precoding matrix is changed by a channel measurement unit and wherein layer permutation is performed on the signal of the layer domain within the channel measurement unit.

Advantageous Effects

According to an embodiment of the present invention, a base station may be able to effectively transmit a DL signal to a mobile station in a multi-antenna wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
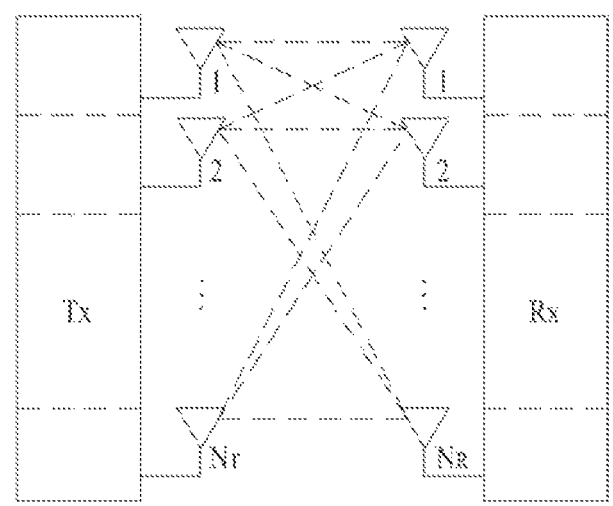
FIG. 1 is a diagram for a configuration of a general multi-antenna (MIMO) communication system.

Reference will now be made in detail to the preferred embodiments of the present invention, examples of which are illustrated in the accompanying drawings. The embodiments described in the following description may include the examples showing that the technical features of the present invention are applied to 3GPP system.

In this specification, 3GPP LTE (Release-8) system may be named LTE system or a legacy system. And, a user equipment supporting the LTE system shall be named LTE user equipment or a legacy user equipment. On the other hand, 3GPP LTE-A (Release-9) system may be named LTE-A system or an evolved system. And, a user equipment supporting the LTE-A system shall be named LTE-A user equipment or an evolved user equipment.

For clarity and convenience, although an embodiment of the present invention is exemplarily disclosed in the present specification using the LTE system and the LTE-A system, the embodiment of the present invention may be also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane may mean a passage for transmitting control messages used by a user equipment and a network to mange a call. And, a user plane may mean a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. If there is an RRC connection established between RRC layers of the user equipment and the network, the user equipment may be in a connected mode. Otherwise, the user equipment may be in an RRC idle mode. NAS (non-access stratum) layer above the RRC layer may perform such a function as session management, mobility management and the like.

One cell, which constructs a base station (eNB), is set to one of bandwidths including 1.25 MHz, 2.5 MHz, 5 MHz, 10 MHz, 15 MHz, 20 MHz and the like and may then provide an uplink or downlink transmission service to a plurality of user equipments. Different cells can be set to provide different bandwidths, respectively.

A downlink transport channel for transporting data to a user equipment from a network may include one of a broadcast channel (BCH) for transporting system information, a paging channel (PCH) for transmitting a paging message, a downlink shared channel (SCH) for transmitting a user traffic or a control message and the like. A traffic or control message of a downlink multicast or broadcast service can be transmitted via a downlink SCH or a separate downlink multicast channel (MCH). Meanwhile, an uplink transport channel for transmitting data from a user equipment to a network may include one of a random access channel (RACH) for transmitting an initial control message, an uplink shared channel (SCH) for transmitting a user traffic or a control message or the like. A logical channel located above a transport channel to be mapped by a transport channel may include one of BCCH (Broadcast Control Channel), PCCH (Paging Control Channel), CCCH (Common Control Channel), MCCH (Multicast Control Channel), MTCH (Multicast Traffic Channel) and the like.

Figure 3:
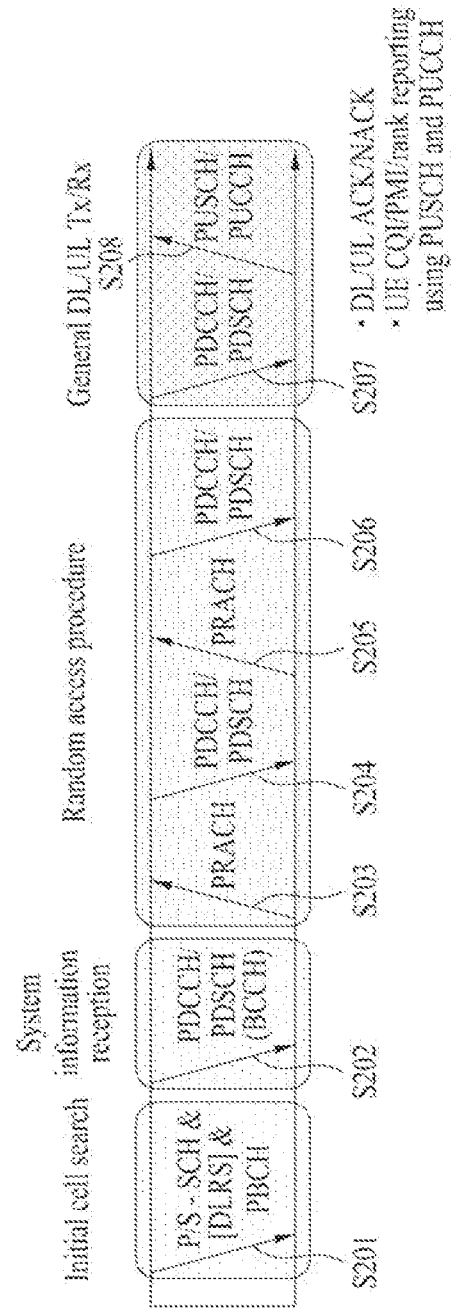
FIG. 3 is a diagram for explaining physical channels used for 3GPP system and a general method of transmitting a signal using the same.

FIG. 3 is a diagram for explaining physical channels used for 3GPP system and a general method of transmitting a signal using the same.

If a power of a user equipment is turned on or the user equipment enters a new cell, the user equipment may perform an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment may receive a downlink reference signal (DL RS) in the initial cell searching step and may be then able to check a downlink channel status.

Having completed the initial cell search, the user equipment may receive a physical downlink control channel (PDCCH) and a physical downlink shared control channel (PDSCH) according to information carried on the physical downlink control channel (PDCCH) and may be then able to obtain system information in further detail [S302].

Meanwhile, if the user equipment initially accesses the base station or fails to have a radio resource for signal transmission, the user equipment may be able to perform a random access procedure (RACH) on the base station [S303 to S306]. For this, the user equipment may transmit a specific sequence as a preamble via a physical random access channel (PRACH) [S303, S305] and may be then able to receive a response message via PDCCH and a corresponding PDSCH in response to the preamble [S304, S306]. In case of contention based RACH, it may be able to perform a contention resolution procedure in addition.

Having performed the above mentioned procedures, the user equipment may be able to perform PDCCH/PDSCH reception [S307] and PUSCH/PUCCH (physical uplink shared channel/physical uplink control channel) transmission [S308] as a general uplink/downlink signal transmission procedure. Meanwhile, control information transmitted/received in uplink/downlink to/from the base station by the user equipment may include DL/UL ACK/NACK signal, CQI (channel quality indicator), PMI (precoding matrix index), RI (rank indicator) and the like. In case of the 3GPP LTE system, the user equipment may be able to transmit the above-mentioned control information such as CQI, PMI, RI and the like via PUSCH and/or PUCCH.

Figure 4:
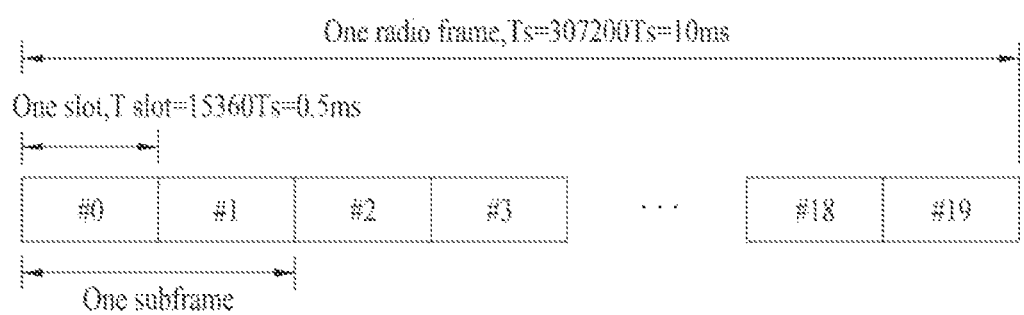
FIG. 4 is a diagram for an example of a structure of a radio frame used for LTE system.

FIG. 4 is a diagram for an example of a structure of a radio frame used for LTE system.

Referring to FIG. 4, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \cdot T_s$). In this case, $T_s$ indicates a sampling time and is expressed as $T_s = 1/(15 \text{ kHz} \times 2048) = 3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot may be modified in various ways.

Figure 5:
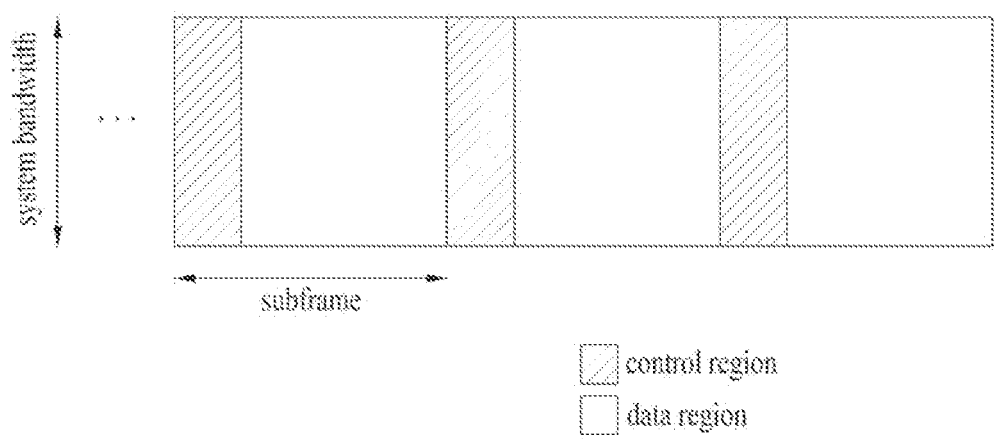
FIG. 5 is a diagram for an example of a functional structure of a downlink (DL) radio frame.

FIG. 5 is a diagram for a functional structure of a downlink (DL) radio frame.

Referring to FIG. 5, a DL radio frame may include 10 subframes equal to each other in length. A subframe in 3GPP LTE system may be defined by a basic time unit of packet scheduling for all DL link frequency. Each subframe may be divided into a time interval (i.e., control region) for transmission of scheduling information and other control informations and a time interval (i.e., data region) for DL data transmission. The control region starts with a $1^{st}$ OFDM symbol and may include at least one or more OFDM symbols. A size of the control region may be set independent per subframe. The control region may be used to transmit L1/L2 (layer 1/layer 2) control signal. And, the data region may be used to transmit DL traffic.

Figure 6:
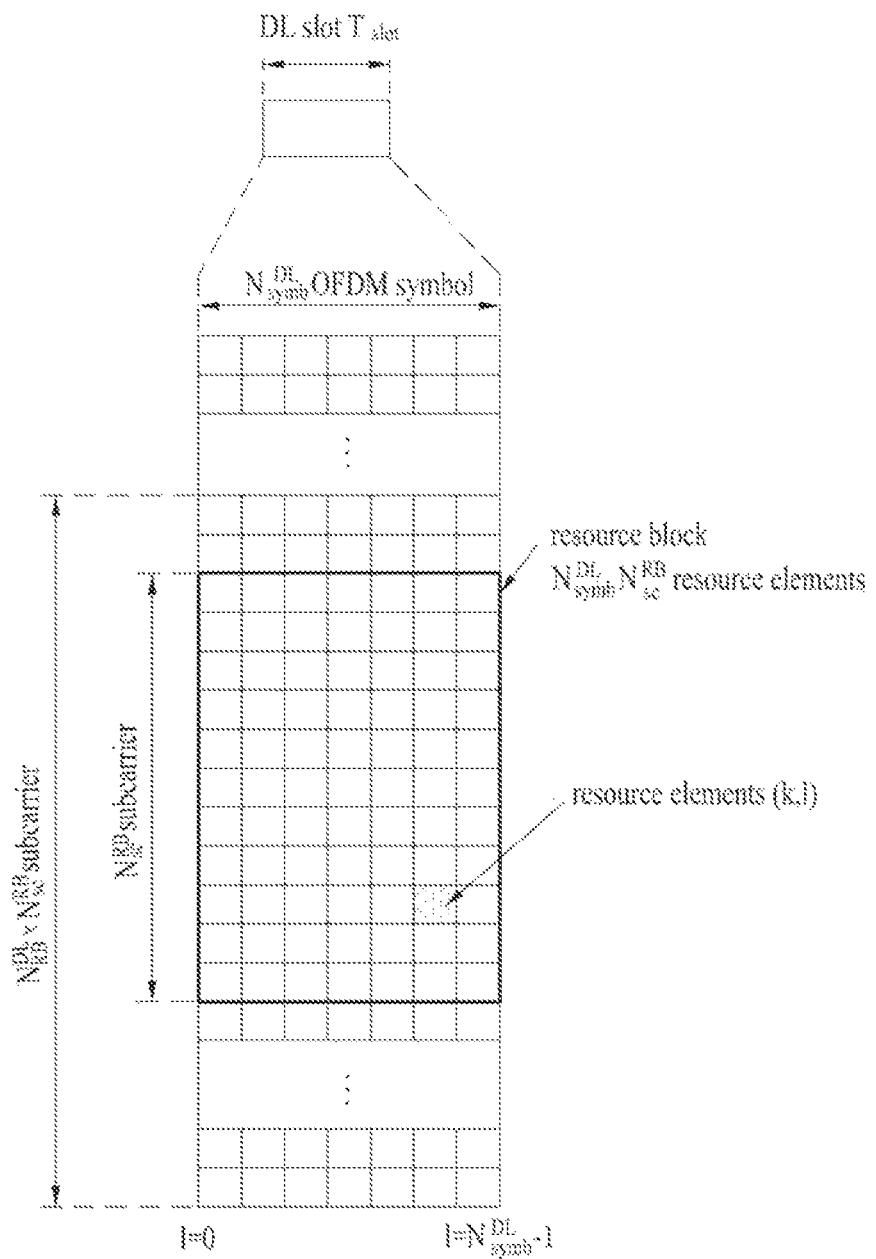
FIG. 6 is a diagram for one example of a resource grid for a DL slot.

FIG. 6 is a diagram for one example of a resource grid for a DL slot.

Referring to FIG. 6, a DL slot may include $N_{symb}^{DL}$ OFDM symbols in time domain and may include $N_{RB}^{DL}$ resource blocks in frequency domain. Since each resource block includes $N_{sc}^{RB}$ subcarriers, the DL slot may include $N_{RB}^{DL} \times N_{sc}^{RB}$ subcarriers in frequency domain. Although FIG. 6 exemplarily shows that the DL slot includes 7 OFDM symbols and that a resource block includes 12 subcarriers, this non-limits the present invention. For instance, the number of OFDM symbols included in the DL slot may vary in accordance with a length of a cyclic prefix (CP).

Each element on a resource grid may be named a resource element (RE). One resource element may be indicated by one OFDM symbol index and one subcarrier index. One RB may include $N_{symb}^{DL} \times N_{sc}^{RB}$ resource elements. The number ($N_{RB}^{DL}$) of resource blocks included in the DL slot may depend on a DL transmission bandwidth set by a cell.

Figure 7:
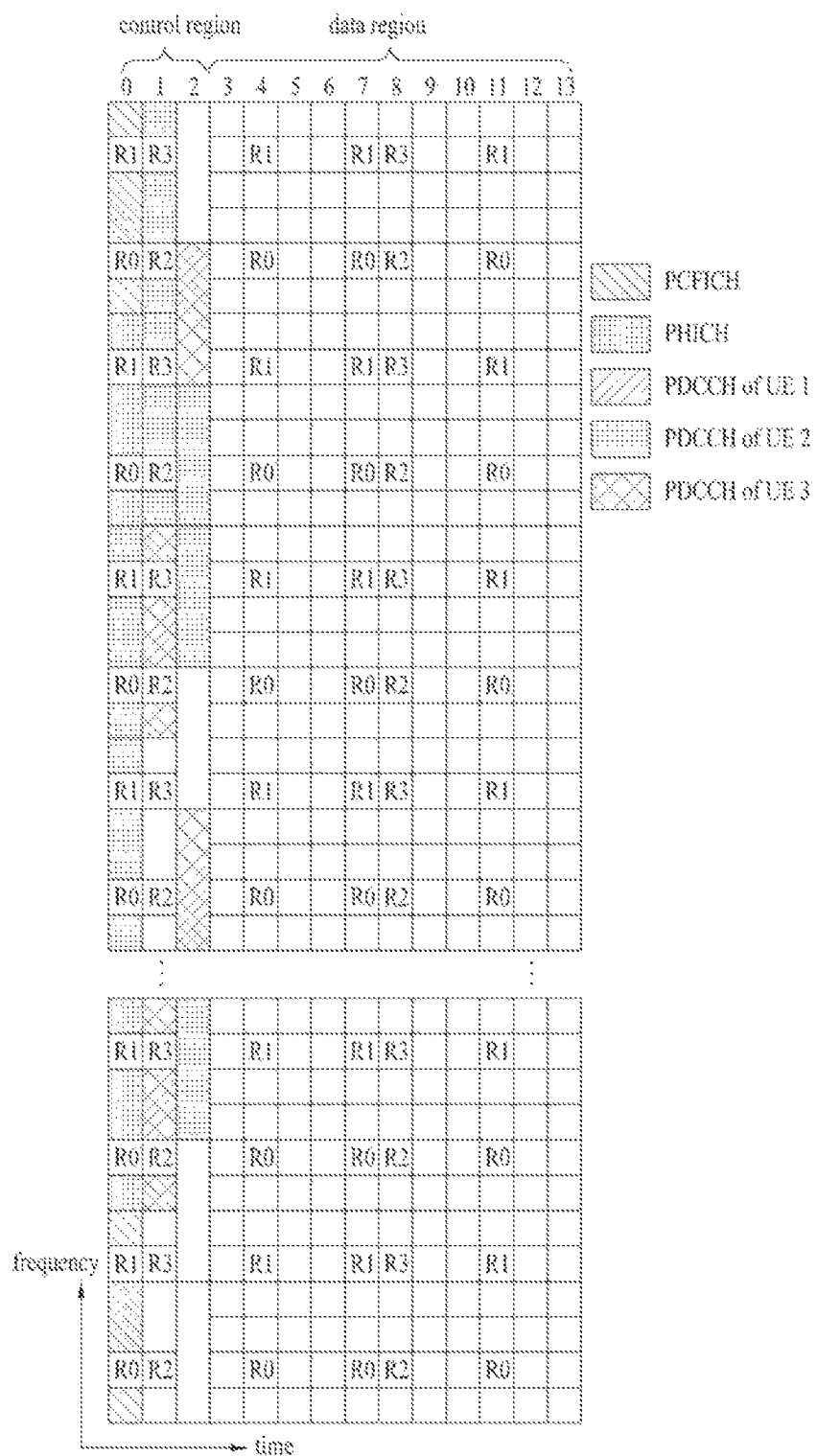
FIG. 7 is a diagram for one example of a control channel included in a control region of a subframe.

FIG. 7 is a diagram for an example of a control channel included in a control region of a subframe.

Referring to FIG. 7, a subframe may include 14 OFDM symbols. First 1 to 3 OFDM symbols may be used as a control region and the rest of 13 to 11 OFDM symbols may be used as a data region, in accordance with subframe settings.

In FIG. 7, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. REG structure will be described in detail with reference to FIG. 5. The PCFICH indicates a value of 1~3 and is modulated by QPSK (quadrature phase shift keying).

The PHICH is a physical HARQ indicator channel and is used in carrying H-ARQ ACK/NACK for uplink transmission. The PHICH is constructed with 3 REGs and is cell-specifically scrambled. The ACK/NACK is indicated by 1 bit, is spread by 'SF (spreading factor)=2 or 4', and is repeated three times. A plurality of PHICHs may be mapped to the same resource. And, the PHICH is modulated by BPSK (binary phase shift keying).

The PDCCH is a physical downlink control channel and is assigned to first n OFDM symbols of a subframe. In this case, 'n' is an integer equal to or greater than 1 and is indicated by the PCFICH. The PDCCH is configured with at least one CCE. This shall be described in detail later. The PDCCH informs each user equipment or UE group of resource allocation information on transport channels PCH (paging channel) and DL-SCH (downlink-shared channel), uplink scheduling grant, HARQ information and the like.

Yet, the PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 8:
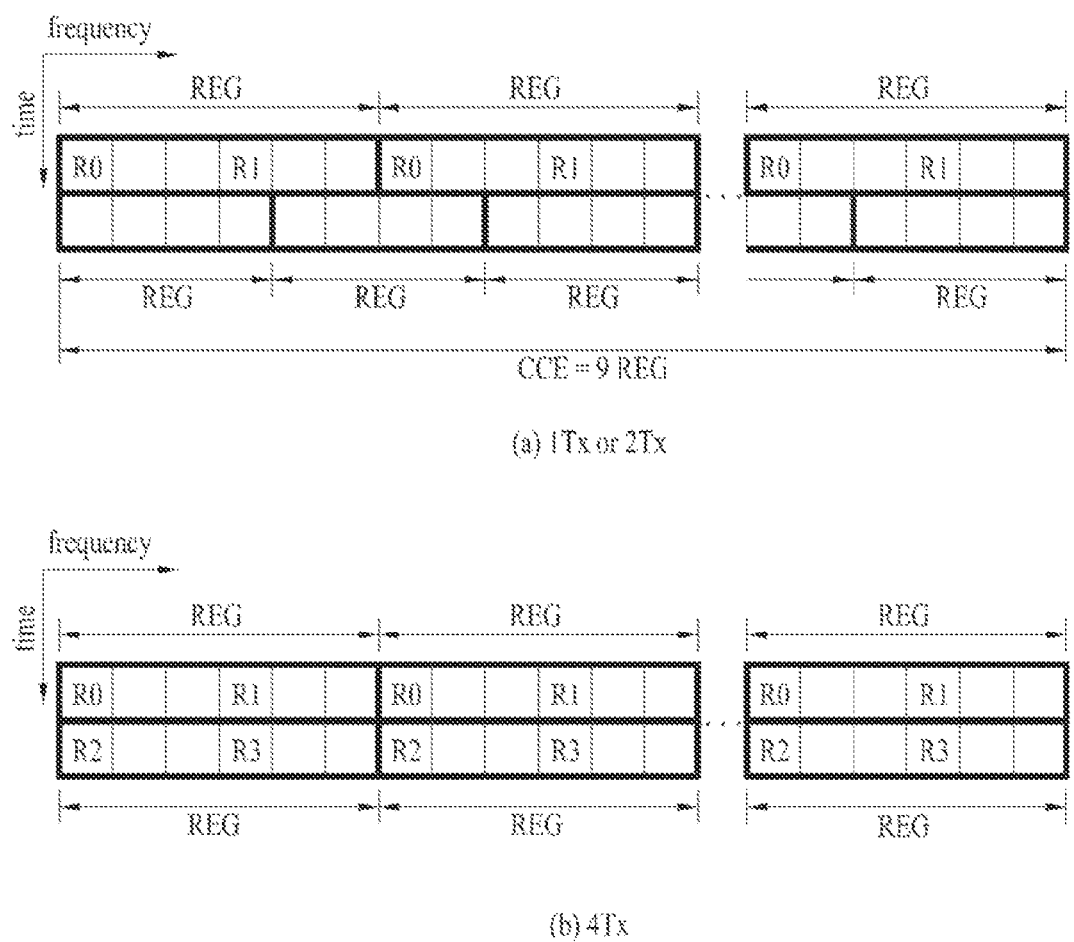
FIG. 8 is a diagram of a resource unit used in configuring a control channel.

FIG. 8(a) and FIG. 8(b) show resource units used in configuring a control channel, respectively. Specifically, FIG. 8(a) shows a case that the number of transmitting antenna(s) is 1 or 2. FIG. 8(b) shows a case that the number of transmitting antennas is 4. And, the former and latter cases only differ from each other in RS (reference signal) pattern according to the number of the transmitting antennas but are identical to each other in a method of setting a resource unit related to a control channel.

Referring to FIG. 8(a) and FIG. 8(b), a basic resource unit of a control channel is REG (resource element group). The REG includes four resource elements (REs) neighbor to one another while RS is excluded. The REG is represented as a bold line in the drawing. PCFICH includes 4 REGs and PHICH includes 3 REGs. PDCCH is configured by CCE (control channel element) unit. And, one CCE includes 9 REGs.

A user equipment may be set to check CCE arranged contiguously or by a specific rule to check whether PDCCH including L CCEs is transmitted to the user equipment. A value of L, which should be taken into consideration for the PDCCH reception, may become plural. And, CCE sets, which should be checked by the user equipment for the PDCCH reception, may be called a search space.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap with each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

Figure 9:
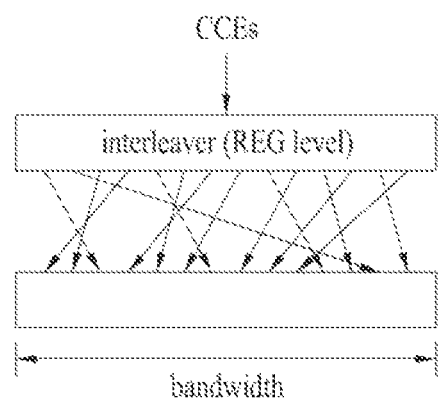
FIG. 9 is a diagram for one example of CCE distribution on a system band.

FIG. 9 is a diagram for one example of CCE distribution on a system band. Referring to FIG. 9, a plurality of CCEs logically contiguous to one another are inputted to an interleaver. In this case, the interleaver plays a role in mixing a plurality of the inputted CCEs by REG unit. Hence, frequency/time resources constructing one CCE are distributed in a manner of being physically scattered on a whole frequency/time domain within a control region of a subframe. Although a control channel is constructed by CCE unit, interleaving is performed by the REG unit. Therefore, it may be able to maximize frequency diversity and interference randomization gain.

Figure 10:
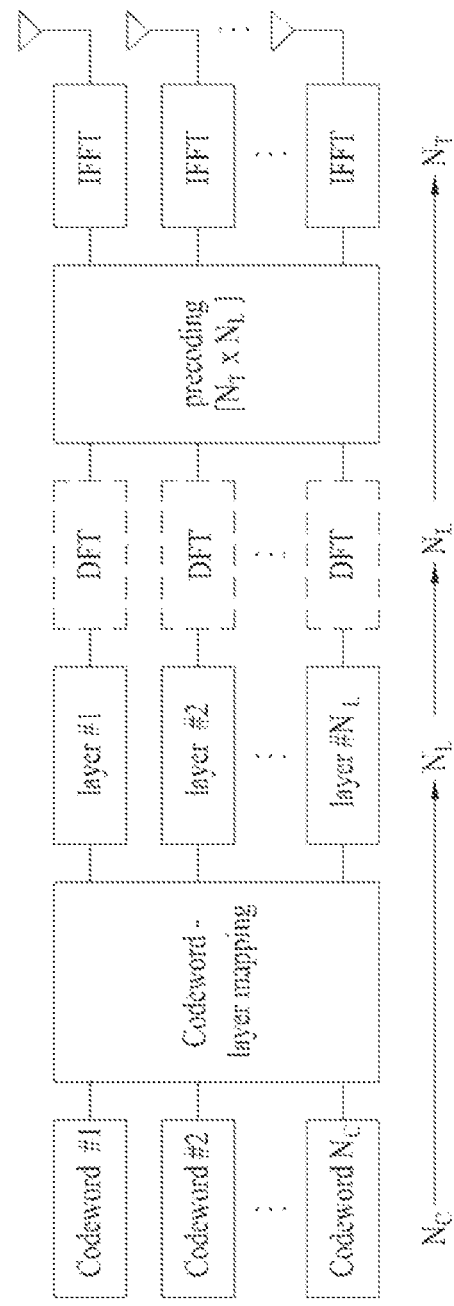
FIG. 10 is a diagram for explaining mapping relations among a code word, a layer and an antenna to transmit a downlink signal in a multi-antenna wireless communication system.

FIG. 10 is a diagram for explaining mapping relations among a code word, a layer and an antenna to transmit a downlink signal in a multi-antenna wireless communication system.

Referring to FIG. 10, a complicated mapping relation may exist between data information and transmission symbol. First of all, a MAC (medium access control) layer may deliver $N_c$ transport blocks as data information to a physical layer. In the physical layer, the transport blocks may be transformed into a code word by channel coding and such a rate matching as puncturing, repetition and the like may be performed. In doing so, the channel coding may be performed by such a channel coder as a turbo encoder, a tail bit convolution encoder and the like.

After completion of the channel coding process and the rate matching process, the $N_C$ code words may be mapped to $N_L$ layers. In this case, each of the layers may indicate a different information sent using MIMO technology and the number of the layers may not be greater than a rank that is the maximum number for sending different informations. This may be represented as such a formula as '# of Layers≤rank (H)≤min($N_T$, $N_R$)', where 'H' means a channel matrix.

For reference, unlike such a general DL transmission scheme as OFDMA (Orthogonal Frequency Division Multiple Access), DFT may be performed on each layer for a UL signal transmitted by SC-FDMA (Single Carrier-Frequency Division Multiple Access) in order to enable a transmitted signal to have a single carrier property by canceling out an effect of IFFT (Inverse Fast Fourier Transform) in part.

The signals transformed by DFT in the layers are multiplied by a precoding matrix, are mapped to $N_T$ transmitting antennas, respectively, and are then transmitted to a base station through IFFT.

Generally, a common reference signal and a UE-specific reference signal may exist in a DL reference signal and the precoding shown in FIG. 10 may not be applied to the common reference signal. In particular, the UE-specific reference signal is precoded by being inserted into a precoding head part and is then transmitted to a user equipment side, in the same manner of normal data.

In order to implement spatial multiplexing transmission non-dependent on channel using a UE-specific reference signal, i.e., a dedicated reference signal, there exist several conditions. First of all, in order to reduce signaling overhead of a reference signal, a transmission reference signal should be precoded using the same precoding matrix of a modulated data symbol. Moreover, in order to obtain spatial channel diversity, a precoding matrix should be switched between antennas. Yet, since the dedicated reference signal is transmitted across a whole transmission resource region according to a specific rule or randomly, it may not be easy to meet the above conditions. Since channel measurement is performed by a unit of a specific number of resource elements for the efficiency of the channel measurement, it may be unable to change a precoding matrix for precoding a dedicated reference signal by a resource element unit. Hence, if a precoding matrix is changeable by each resource element unit and a precoded dedicated reference signal does not exist in each resource element, it may cause a problem that the dedicated reference signal is unable to perform a channel measurement of a resource element carrying a precoded data.

Figure 11:
FIG. 11 is a diagram for one example of resource allocation to transmit a transmission reference signal and data in a single antenna transmission.

FIG. 11 is a diagram for one example of resource allocation to transmit a transmission reference signal and data in a single antenna transmission.

Referring to FIG. 11, as a transmitted reference signal is not transmitted via all subcarriers on a frequency axis, it may be impossible to change a precoding matrix for each resource element that carries data. Likewise, since the transmitted reference signal is not transmitted via all symbols on a time axis, it may be impossible to change a precoding matrix for each symbol that carries data. Hence, in order to implement a channel non-dependent space multiplexing transmission using a dedicated reference signal, it may be necessary to change a common precoding matrix applied to a specific number of resource element groups for the dedicated reference signal and data. In this case, a specific number of resource element groups may indicate a unit for a receiving side to perform a modulation process. Since a same precoding matrix is applied to a transmitted reference signal and data, channel measurement may be performed by a unit of the specific number of resource element groups.

If a common precoding matrix is applied, as mentioned in the above description, in order to obtain random beamforming diversity, data capable of being included in one transport block may be transmitted via all layers (i.e., space domain). In this case, a separate division process may be required. In the following description, if channel non-dependent multiplexing is performed using a common precoding matrix, a method for maximizing random beamforming diversity and space diversity shall be described.

According to the present invention, in order to maximize random beamforming diversity together with space diversity, a different precoding matrix is applied to each channel measurement unit and a permutation is performed in a channel measurement unit by a unit of a specific number of resource elements.

Figure 12:
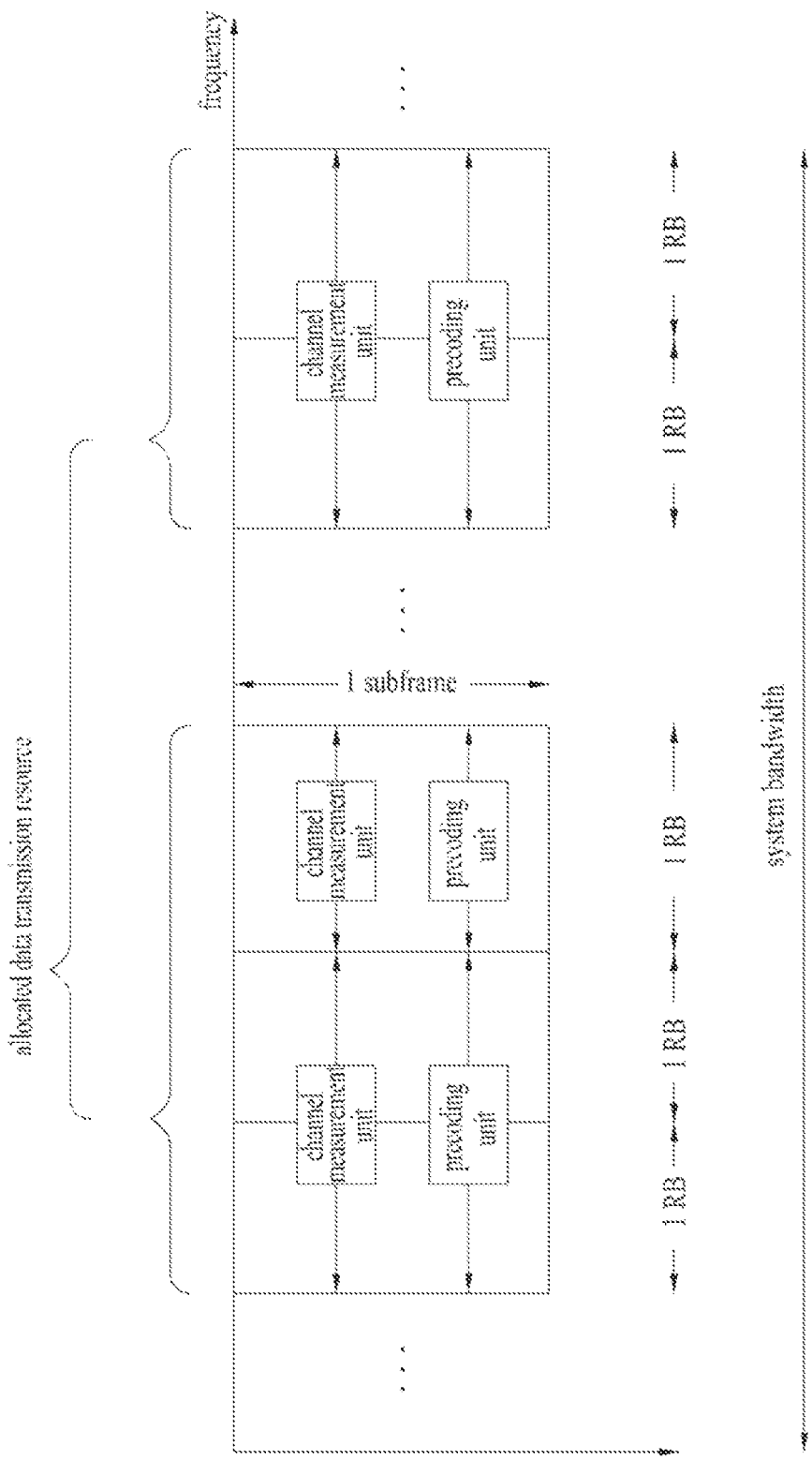
FIG. 12 is a diagram for a relation between a channel measuring unit and a precoding unit according to an embodiment of the present invention.

FIG. 12 is a diagram for a relation between a channel measuring unit and a precoding unit according to an embodiment of the present invention.

Referring to FIG. 12, a resource block (RB) indicates a group configured with a specific number of resource elements, e.g., 12 resource elements. A precoding matrix for a dedicated reference signal may be changeable for each channel measurement unit. And, a permutation by a layer unit may be additionally performed in the channel measurement unit.

In this case, a channel measurement unit may include at least one resource block and a channel measurement may be individually performed on each channel measurement unit. Since a transmitting stage applies a precoding matrix to both a dedicated reference signal and a data symbol, a receiving stage may need to perform a channel measurement on a data mapped layer. Thus, a dedicated reference signal may be transmitted by a layer carrying data thereon only and an overhead may be reduced owing to the reduction of unnecessary transmitted reference signals.

Due to a channel measurement performed by a unit of at least one resource block, a precoding matrix may be changed for each channel measurement unit. Hence, a transmitting stage may be able to obtain random beamforming diversity. Moreover, a layer permutation may be performed in a channel measurement unit.

Figure 13:
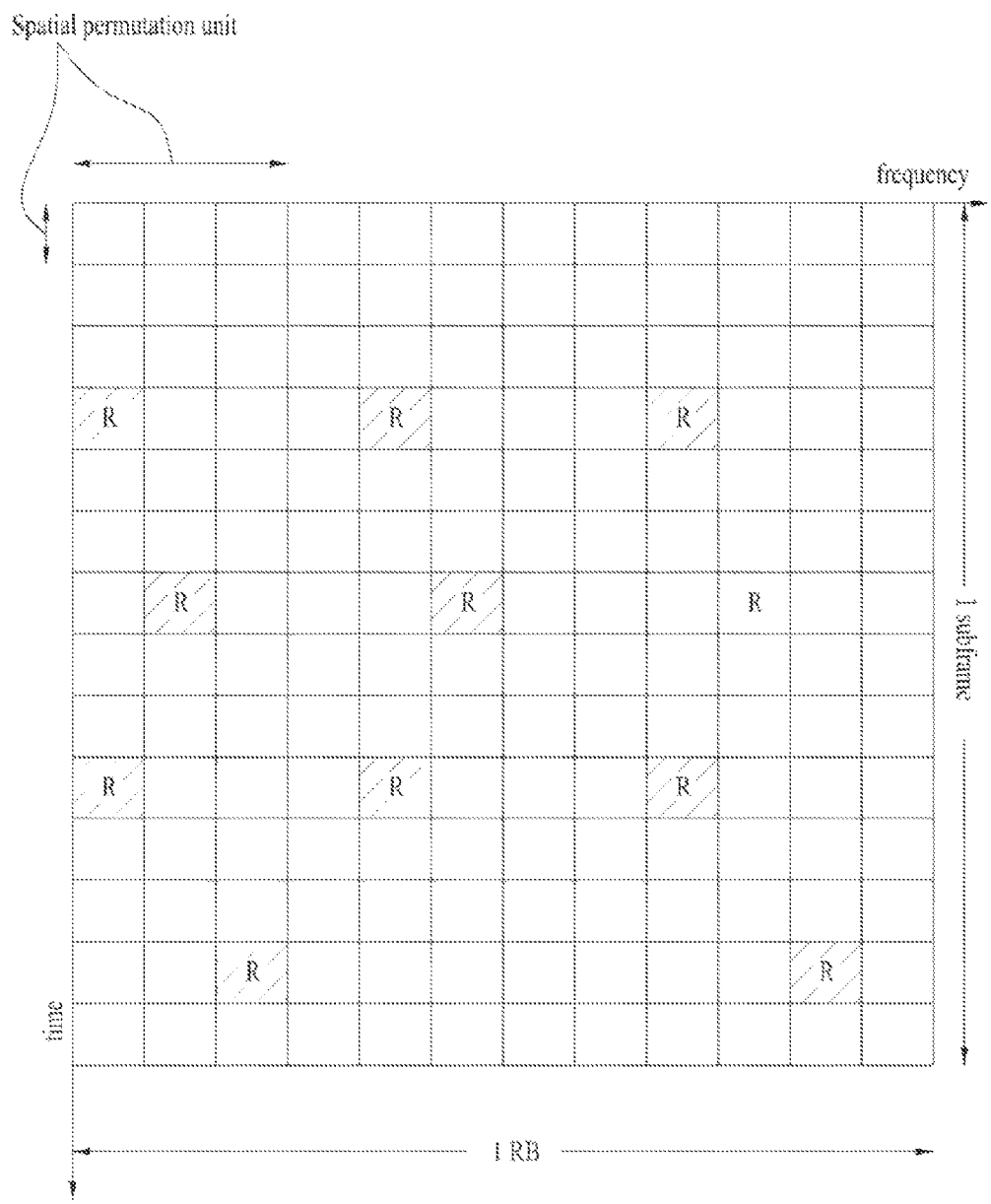
FIG. 13 is a diagram of a layer permutation process according to an embodiment of the present invention.

FIG. 13 is a diagram of a layer permutation process according to an embodiment of the present invention. In particular, although FIG. 13 shows a layer permutation performed in one resource block, if a channel measurement unit includes a plurality of resource blocks, a layer permutation may be performed in a plurality of the resource blocks as well.

Referring to FIG. 13, it may be observed that a layer permutation (spatial permutation) unit is set to '1 symbol×3 resource elements'. A dedicated reference signal is not spatially permutated but data should be permutated by a transport layer unit only.

In the following description, a method of implementing a layer permutation of data shall be explained in detail.

Figure 14:
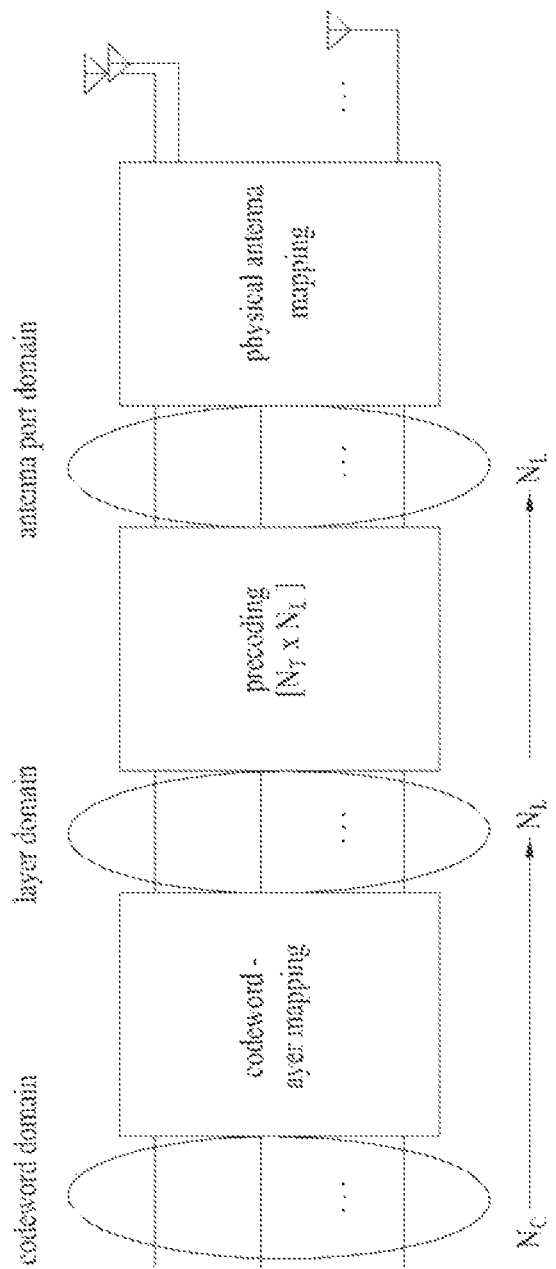
FIG. 14 is a diagram for a part of a general DL transmission process.

FIG. 14 is a diagram for a part of a general DL transmission process.

Referring to FIG. 14, a state prior to codeword-layer mapping shall be named a codeword domain and a state prior to precoding after codeword-layer mapping shall be named a layer domain. And, a state prior to physical antenna mapping after precoding shall be named an antenna port domain.

As mentioned in the foregoing description, since it is unable to perform permutation on a dedicated reference signal and data having a precoding matrix applied thereto in an antenna port domain, a layer permutation should be performed in the codeword domain or the layer domain.

Figure 15:
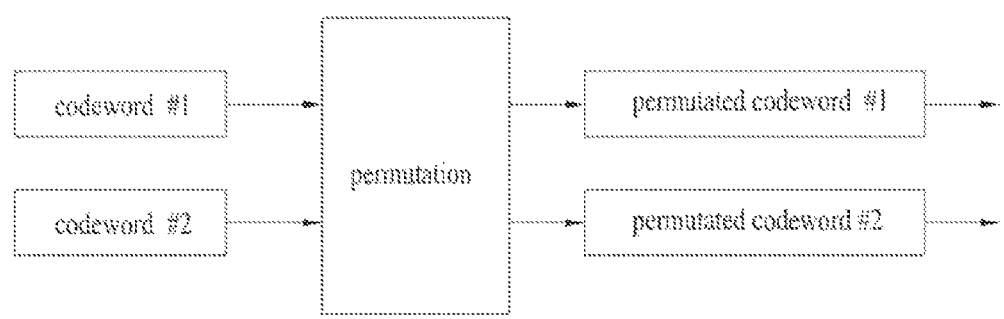
FIG. 15 is a diagram of a layer permutation according to a $1^{st}$ embodiment of the present invention.

FIG. 15 is a diagram of a layer permutation according to a $1^{st}$ embodiment of the present invention. In particular, FIG. 15 shows a case that a bit permutation is performed in a codeword domain.

Referring to FIG. 15, for clarity and convenience of the following description, assume 2 codewords. Data included in one codeword in a codeword domain may be permutated or mixed with data included in another codeword. And, outputted codewords may be able to include data included in inputted codewords all. By this method, a layer permutation may be indirectly performed and space diversity may be obtained.

Figure 16:
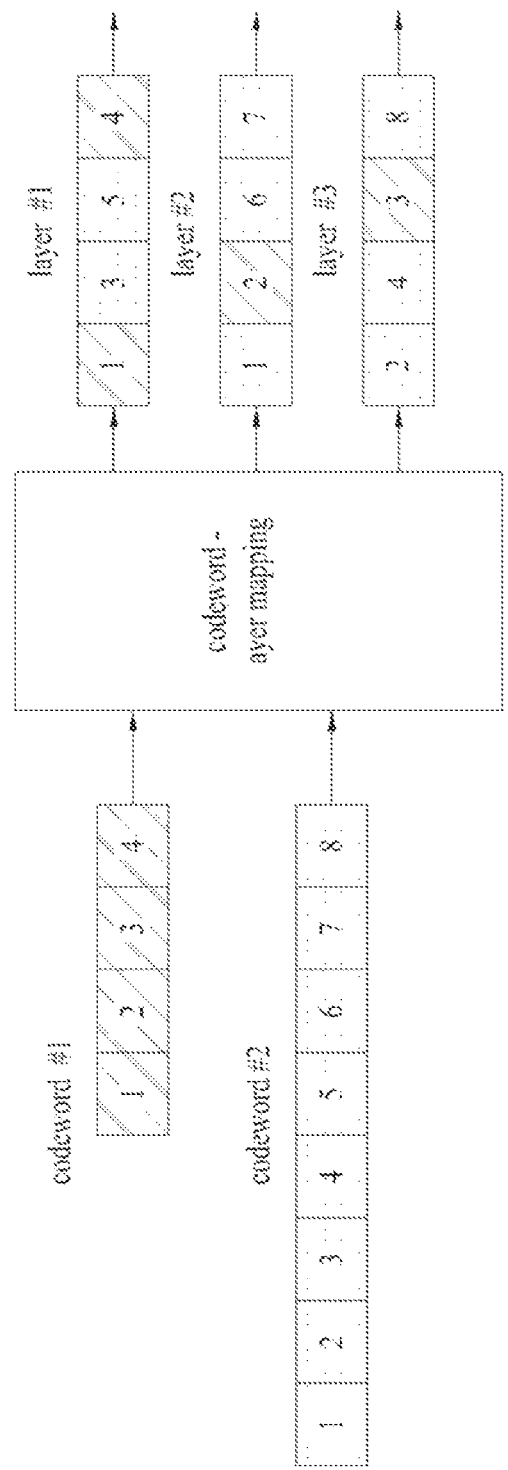
FIG. 16 is a diagram of a layer permutation according to a $2^{nd}$ embodiment of the present invention.

FIG. 16 is a diagram of a layer permutation according to a $2^{nd}$ embodiment of the present invention. In particular, FIG. 16 shows a case that a bit permutation is performed in a codeword-layer mapping process. For clarity and convenience of the following description, assume a case that 2 codewords are mapped to 3 layers.

Referring to FIG. 16, data included in 2 codewords are mapped to 3 layers by being mixed together. In particular, among data included in a $1^{st}$ codeword, $1^{st}$ and $4^{th}$ data are mapped to a $1^{st}$ layer, $2^{nd}$ data is mapped to a $2^{nd}$ layer, and $3^{rd}$ data is mapped to a $3^{rd}$ layer. Likewise, among data in a $2^{nd}$ codeword, $3^{rd}$ and $5^{th}$ data are mapped to the $1^{st}$ layer, $1^{st}$, $6^{th}$ and $7^{th}$ data are mapped to the $2^{nd}$ layer, and $2^{nd}$, $4^{th}$ and $8^{th}$ data are mapped to the $3^{rd}$ layer. Through this method, it may be able to perform a layer permutation indirectly.

Figure 17:
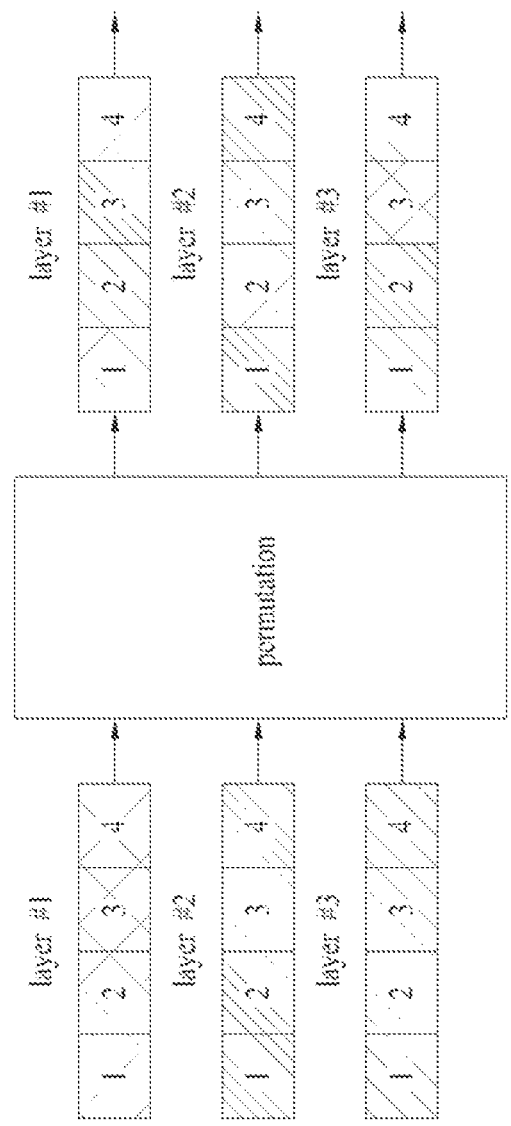
FIG. 17 is a diagram of a layer permutation according to a $3^{rd}$ embodiment of the present invention.

FIG. 17 is a diagram of a layer permutation according to a $3^{rd}$ embodiment of the present invention. In particular, FIG. 17 shows a case that a bit (or symbol) permutation is performed in a layer domain. For clarity and convenience of the following description, assume a case that 3 layers exist.

Referring to FIG. 17, as a permutation and a mixing process are performed on informations included in layers, it can be observed that the informations included in the inputted layers co-exist in an outputted layer.

Thus, as a method of implementing a layer permutation in a layer domain, it may be able to exemplarily propose a method of circulating an output layer mapped per bit in each inputted layer. In particular, it may be able to circulate a layer mapping index like $\{1, 2, 3\}$, $\{3, 1, 2\}$ or $\{2, 3, 1\}$. This may be represented as a formula as follows.

$$Y_i = W \cdot \bar{x}_i = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \cdot \begin{bmatrix} x_1^{(i)} \\ x_2^{(i)} \\ x_3^{(i)} \end{bmatrix} \quad \text{[Formula 6]}$$

Formula 6 shows one example of the precoding process shown in FIG. 14, $\bar{x}_i$ means a signal in a layer domain, and W indicates a precoding matrix. In particular, Formula 6 means a process for transforming a signal of a layer domain into a signal of an antenna port domain. The total number of layers is 3 and the number of antenna ports is 3.

If a layer permutation according to a $3^{rd}$ embodiment of the present invention is applied to Formula 6, it may be represented as Formula 7.

$$Y_i = W \cdot P_i \cdot \bar{x}_i \quad \text{[Formula 7]}$$

$$= \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \cdot \begin{bmatrix} p_{11}^{(i)} & p_{12}^{(i)} & p_{13}^{(i)} \\ p_{21}^{(i)} & p_{22}^{(i)} & p_{23}^{(i)} \\ p_{31}^{(i)} & p_{32}^{(i)} & p_{33}^{(i)} \end{bmatrix} \begin{bmatrix} x_1^{(i)} \\ x_2^{(i)} \\ x_3^{(i)} \end{bmatrix}$$

In Formula 7, $P_i$ means a permutation matrix and is applied between a signal of a layer domain and a precoding matrix. And, it may be observed that a layer permutation is performed prior to applying a precoding matrix of a channel measurement unit. Yet, although a different permutation matrix may be applicable between signals of different layer domains or signal vectors, as mentioned in the foregoing description, a same precoding matrix W should be applied within one channel measurement unit. Of course, the precoding matrix W may be changeable in each channel measurement unit.

As a different permutation matrix is applied to each signal vector of a layer domain, all information of each layer may be mapped to a different antenna port, whereby space diversity may be obtained as well.

Figure 18:
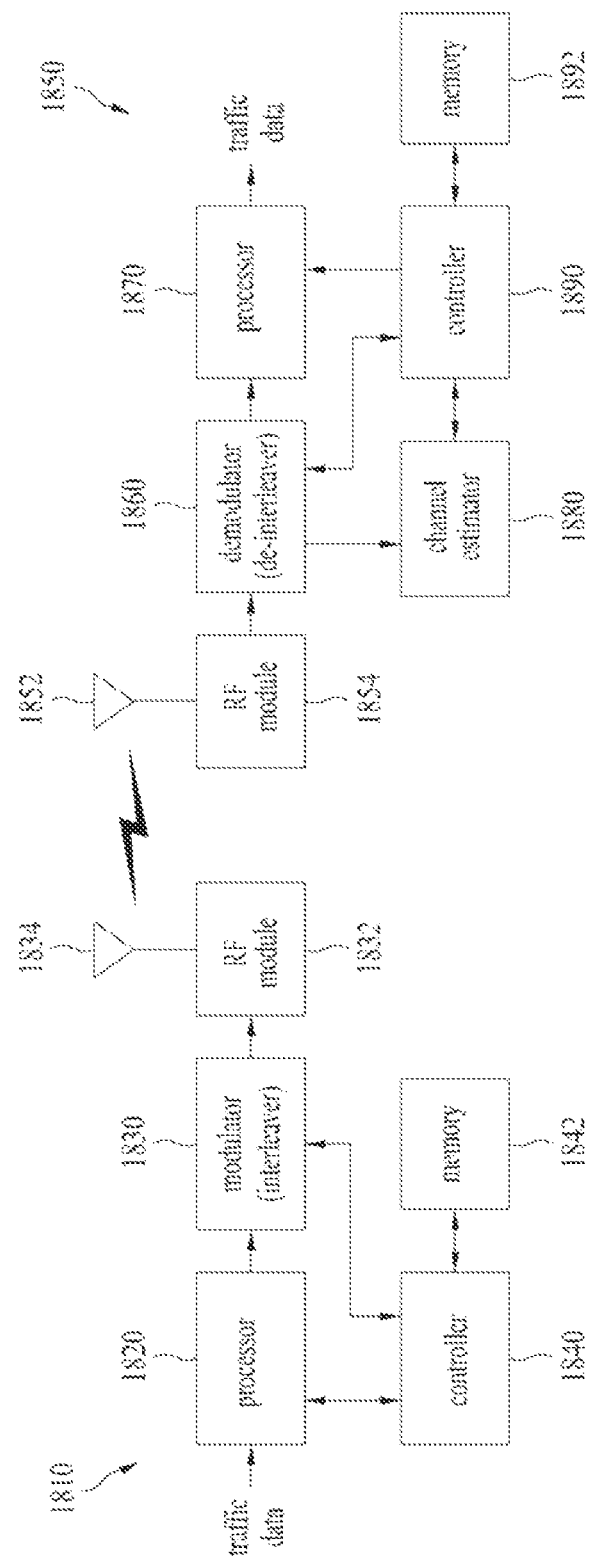
FIG. 18 is a block diagram of a user equipment according to one embodiment of the present invention.

FIG. 18 is a block diagram of a user equipment according to one embodiment of the present invention. In downlink, a transmitter 1810 may be a part of a base station and a receiver 1850 may be a part of a user equipment. In uplink, a transmitter 1810 may be a part of a user equipment and a receiver 1850 may be a part of a base station.

In a transmitter 1810, a processor 1820 generates data symbols by performing encoding, interleaving and symbol mapping on data (e.g., traffic data and signaling). And, the processor 1820 generates pilot symbols and then multiplexes data and pilot symbols with each other.

A modulator 1830 generates transmission symbols according to a wireless access scheme. The wireless access scheme includes one of FDMA, TDMA, CDMA, SC-FDMA, MC- FDMA, OFDMA and combinations thereof. And, the modulator 1830 enables data to be transmitted in a manner of being distributed in a frequency domain by one of the various permutation methods according to embodiments of the present invention. A radio frequency (RF) module 1832 generates an RF signal, which is to be transmitted via an antenna 1834, by performing a processing (e.g., analog conversion, amplification, filtering and frequency uplink transform) on the transmission symbol.

In the receiver 1850, an antenna 1852 receives a signal transmitted by the transmitter 1810 and then provides it to an RF module 1854. The RF module 1854 provides input samples by performing a processing (e.g., filtering, amplification, frequency downlink transform, digitalization, etc.) on the received signal.

A demodulator 1860 provides a data value and a pilot value by demodulating the input samples. A channel estimator 1880 derives a channel estimation value based on the received pilot values. The demodulator performs a data detection (or an equalization) on the data values using the channel estimation value and provides data symbol estimation values for the transmitter 1810. The demodulator 1860 may be able to rearrange the distributed data in a frequency domain and a time domain in original order by performing an operation inverse to one of the various permutations methods according to the embodiments of the present invention. A processor 1870 performs symbol demapping, de-interleaving and decoding on the data symbol estimation values and then provides decoded data.

Generally, the processings by the demodulator 1860 and the 1870 in the receiver 1850 are mutually supplemented with the processings of the modulator 1830 and the processor 1820 in the transmitter 1810, respectively.

A controller 1840/1890 monitors and controls operations of various modules existing in the transmitter/receiver 1810/1850. And program codes and data for the transmitter/receiver 1810/1850 are stored in a memory 1842/1892.

The modules exemplarily shown in FIG. 18 may be provided for the description. The transmitter and/or the receiver may further include necessary module(s). The modules/functions may be omitted in part or separated into different modules. And, at least two of the modules may be integrated into one module.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention may be described centering on the data transmission/reception relations between a relay node and a base station. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other network nodes except the base station. In this case, 'base station' may be replaced by such a terminology as a fixed station, a Node B, an eNode B (eNB), an access point and the like. And, 'terminal' may be replaced by such a terminology as UE (User Equipment), MS (Mobile Station), MSS (Mobile Subscriber Station) and the like.

Embodiments of the present invention may be implemented using various means. For instance, embodiments of the present invention can be implemented using hardware, firmware, software and/or any combinations thereof. In case of the implementation by hardware, one embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

As mentioned in the foregoing description, although a method of transmitting a sounding reference signal in a multi-antenna wireless communication system and apparatus therefor are described mainly with reference to examples applied to 3GPP LTE system, the present invention may be applicable to various kinds of multi-antenna wireless communication systems as well as the 3GPP LTE system.

What is claimed is:

1. A method of transmitting a downlink signal in a multi-antenna wireless communication system, the method comprising:
   mapping signals of a codeword domain to signals of a layer domain;
   mapping the signals of the layer domain to signals of an antenna port domain using a precoding matrix; and
   transmitting the signals of the antenna port domain by allocating the signals of the antenna port domain to physical antenna ports,
   wherein the precoding matrix is changed by a channel measurement unit, and
   wherein a layer permutation of the signals of the layer domain is performed within the channel measurement unit.

2. The method of claim 1, wherein the channel measurement unit comprises at least one resource block (RB).

3. The method of claim 2, wherein the layer permutation is performed in the codeword domain by permuting the signals of the codeword domain by a bit unit before mapping the signals of the codeword domain to the signals of the layer domain.

4. The method of claim 1, wherein the layer permutation is performed in mapping the signals of the codeword domain to the signals of the layer domain by permuting data included in each of the signals of the codeword domain by a bit unit.

5. The method of claim 1, wherein the layer permutation is performed in the layer domain by permuting the signals of the layer domain by a bit unit or by a symbol unit before mapping the signals of the layer domain to the signals of the antenna port domain.

6. A base station having a multi-antenna, the base station comprising:
a processor configured to map signals of a codeword domain to signals of a layer domain, map the signals of the layer domain to signals of an antenna port domain using a precoding matrix, and allocate the signals of the antenna port domain to physical antenna ports; and
a transmitting module configured to transmit the signals allocated to the physical antenna ports,
wherein the precoding matrix is changed by a channel measurement unit, and
wherein layer permutation of the signals of the layer domain is performed within the channel measurement unit.

7. The base station of claim 6, wherein the channel measurement unit comprises at least one resource block (RB).

8. The base station of claim 7, wherein the processor performs the layer permutation in the codeword domain by permuting the signals of the codeword domain by a bit unit before mapping the signals of the codeword domain to the signals of the layer domain.

9. The base station of claim 6, wherein the processor performs the layer permutation in mapping the signals of the codeword domain to the signals of the layer domain by permuting data included in each of the signals of the codeword domain by a bit unit.

10. The base station of claim 6, wherein the processor performs the layer permutation in the layer domain by permuting the signals of the layer domain by a bit unit or by a symbol unit before mapping the signals of the layer domain to the signals of the antenna port domain.

* * * * *